Figure 3:
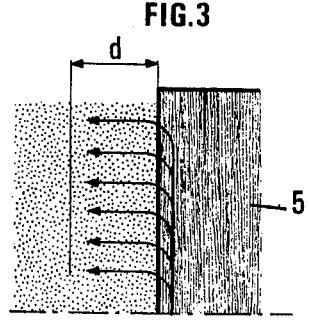

United States Patent [19]

Cheron et al.

[11] 4,063,899
[45] Dec. 20, 1977

[54] DECARBONATING A GAS WITH A WETTED FILTER

[75] Inventors: Jacques Cheron, Maisons-Laffitte; Dany Catoire, Genevilliers, both of France

[73] Assignee: Institut Francais du Petrole, France

[21] Appl. No.: 521,902

[22] Filed: Nov. 7, 1974

[30] Foreign Application Priority Data
Nov. 26, 1973 France .................. 73.42263

[51] Int. Cl.$^2$ ............ B01J 1/22; B01D 53/14; B01J 8/02
[52] U.S. Cl. .................. 23/284; 23/282; 55/233; 55/DIG. 30; 261/99
[58] Field of Search ............ 23/284, 281, 282; 55/233, DIG. 30; 261/99, 97, 107

[56] References Cited
U.S. PATENT DOCUMENTS

| 1,275,563 | 8/1918 | Jones | 261/99 |
|---|---|---|---|
| 2,474,746 | 6/1949 | Lopez et al. | 55/233 X |
| 2,677,601 | 5/1954 | Ruth | 23/284 |
| 2,865,720 | 12/1958 | Guild | 23/284 |
| 2,878,107 | 3/1959 | Ruth | 55/DIG. 30 |
| 2,952,526 | 9/1960 | Carlson et al. | 23/284 |
| 3,528,781 | 9/1970 | Gelfman et al. | 23/284 |
| 3,649,360 | 3/1972 | Bloomfield et al. | 23/282 X |
| 3,683,626 | 8/1972 | Merrill | 55/DIG. 30 |
| 3,735,567 | 5/1973 | Viers | 23/284 X |
| 3,910,252 | 10/1975 | Richard | 55/DIG. 30 |

OTHER PUBLICATIONS

Perry, "Chemical Engineers" Handbook, 4th ed., p. 10–14 (1963).

Primary Examiner—Norman Yudkoff
Assistant Examiner—Barry I. Hollander
Attorney, Agent, or Firm—Craig & Antonelli

[57] ABSTRACT

This device comprises a filtering cartridge of soda-lime capable of removing carbon dioxide from a gas flow, this cartridge being provided with means substantially compensating for any decrease in the water content of the soda-lime.

19 Claims, 7 Drawing Figures

FIG.1
FIG.2
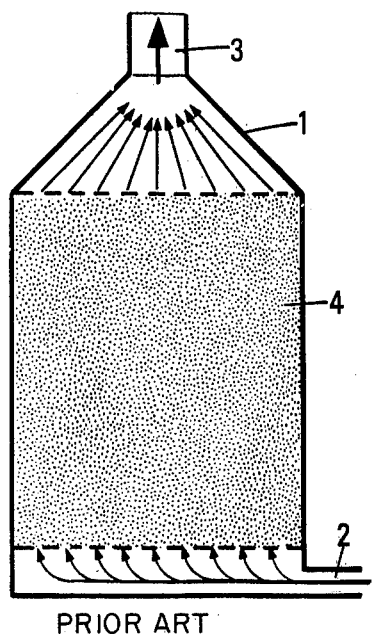
PRIOR ART
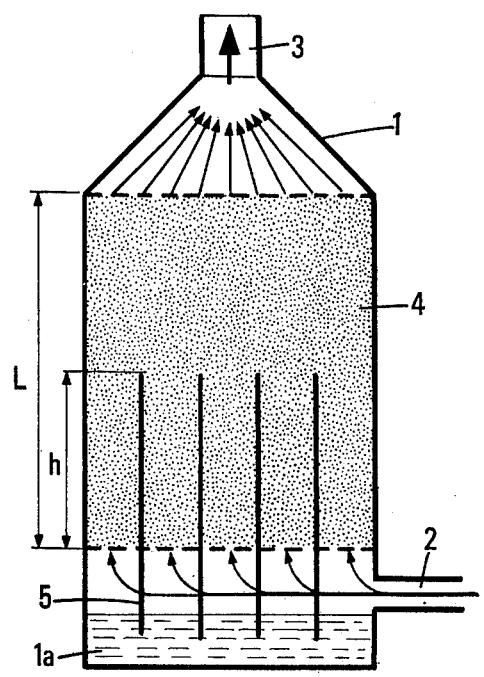
FIG.2A
FIG.2B
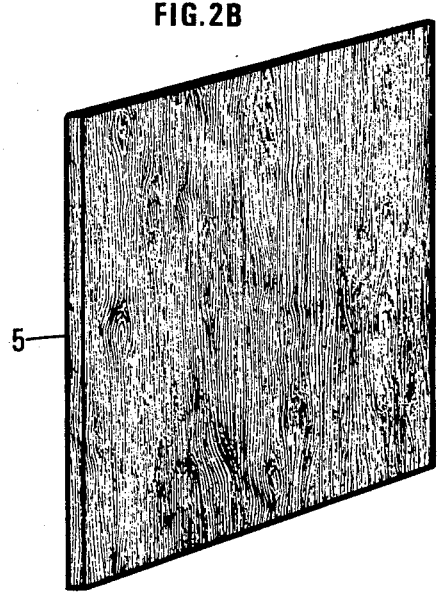

DECARBONATING A GAS WITH A WETTED FILTER

The present invention relates to an improved device for removing carbon dioxide (CO$_2$) from a gas or gas mixture.

The conventional devices for decarbonating gases, are based on different processes. In particular, in some devices, the gas to be decarbonated flows through a "filtering cartridge" filled with soda lime, which absorbs carbon dioxide. This produces, in a first stage, sodium carbonate, according to the reaction: CO$_2$ + 2 NaOH → Na$_2$CO$_3$ + H$_2$O then, in a second stage, a fraction of the carbon dioxide migrates from the soda to the calcium hydroxide, according to the following reaction:

$$Na_2CO_3 + Ca(OH)_2 \rightarrow CaCO_3 + 2\ NaOH$$

Practically, only a certain fraction of the soda is regerated through this last reaction. Consequently, the efficiency of the prior devices based on this decarbonation process is much lower than the theoretical efficiency corresponding to the amount of soda lime which is used.

It therefore becomes necessary, either to increase the size of the reaction vessels, so that they can house a quantity of soda lime greater than the theoretical quantity which corresponds to the quantity of gas to be decarbonated, or, alternatively, to frequently replace the used soda lime with fresh soda lime.

These drawbacks result in a higher cost of the gas decarbonation.

The main object of the present invention is accordingly to provide an improved gas decarbonatation device, based on the above indicated process, i.e. using a CO$_2$ absorbent such as soda lime, this device having performances which are substantially better than those of the prior devices of this type.

Thus for the same performances, the devices according to the invention may have a much smaller size than the prior devices or require less frequent changes of the soda lime, which result in a decrease of maintainance costs.

Moreover, for the same quantity of soda lime, the device according to the invention permits a better purification of the gases, thus having a greater efficiency than the known prior devices.

Figure 4:
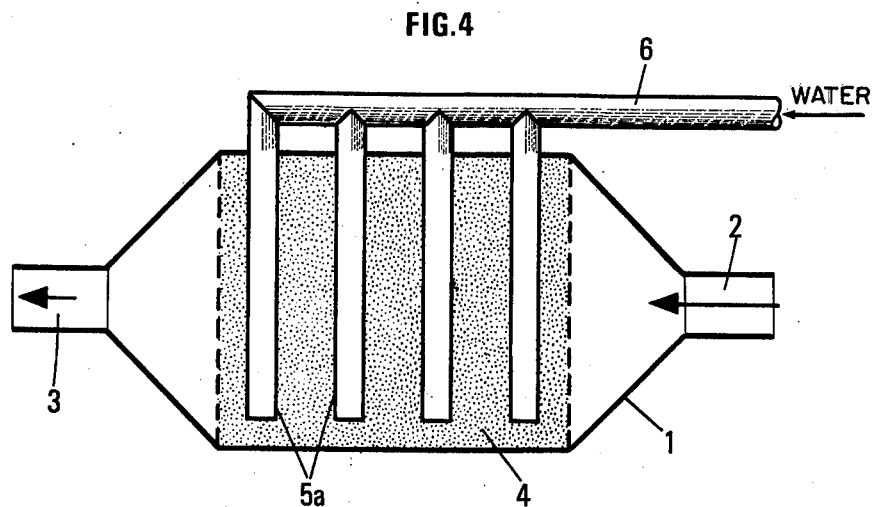
Figure 5:
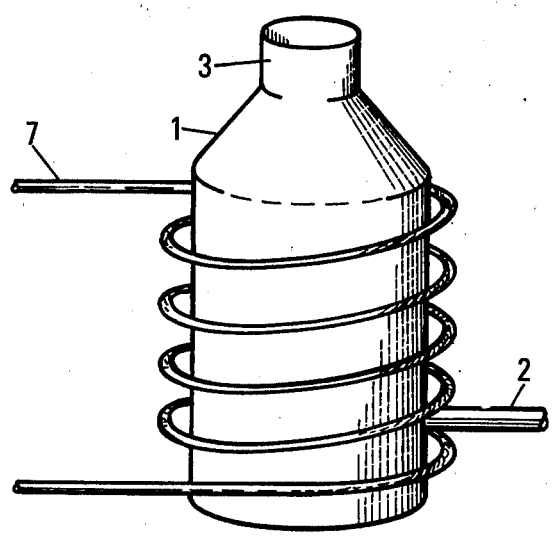

The invention will be easily understood and advantages thereof made apparent from the following description of some embodiments, illustrated by the accompanying drawings, wherein:

FIG. 1 shows for comparative purpose a prior art decarbonatation device,

FIG. 2 diagrammatically illustrates the improved device according to the invention, FIGS. 2A and 2B are perspective views of two types of elements for transferring water by capillarity, FIG. 3 diagrammatically shows water migration in the soda lime, from these tranfer elements, FIG. 4 illustrates another embodiment of the invention, FIG. 5 is a modification of the embodiment illustrated by FIG. 2.

Throughout the drawings, same reference numerals have been used to designate like elements.

FIG. 1 diagrammatically illustrates, in vertical cross section, a prior art gas decarbonatation device.

This device comprises a body 1 provided with an inlet orifice for a carbon dioxide-containing gas, and an outlet orifice 3 for recovering the purified gases.

Within vessel 1, between the orifices 2 and 3 is placed a filtering "cartridge" 4 containing soda lime in the form of granules.

As a consequence, the gas entering the inlet orifice 2, necessarily flows through the filtering cartridge 4, before escaping through the outlet orifice 3.

During the passage of this gas through the filtering cartridge, carbon dioxide CO$_2$ is absorbed according to the above-indicated chemical reactions.

There is generally used soda lime of commercial grade, which contains about 16% by weight of water.

The gas passing through the filtering cartridge dries the soda lime the more rapidly as the flow rate of the treated gas is greater.

We have ascertained that the reduction of the water content of the soda lime results in a high decrease of its absorption capacity, with respect to carbon dioxide.

Consequently, the prior devices show very limited performances and suffer from the above-mentioned drawback.

This drawback is obviated by using a device according to the invention, which comprises means for compensating at least partially, any reduction in the amount of water contained in the soda lime.

The preferred embodiment of the invention is diagrammatically illustrated by FIG. 2, in vertical cross-section.

In this embodiment, the device according to the invention comprises a water storage tank 1a placed below the body 1 of the device.

This tank 1a may be separate from the body 1 or, as illustrated in FIG. 2, may be formed as an extension of the lower part of the body 1, below the level of the inlet orifice 2.

The transfer of water from the tank 1a to the filtering cartridge 4, is performed through one or a plurality of elements 5, each having one end immersed in the water of the tank 1a the other end penetrating, through orifices provided for this purpose, in the filtering cartridge, up to a height h above the bottom of the cartridge 4.

The portion of the transfer elements 5 penetrating in the filtering cartridge 4 is in contact with the granules of soda lime housed in the filtering cartridge. These elements 5 are adapted to transfer water by capillary action.

To this end, they will preferably be made of agglomerated fibers, for example felt.

These elements may be of elongated shape, with a substantially cylindrical outer wall, or have an outer flat surface, or also be of tubular shape, etc....

The choice of the shape, the size and characteristics of the elements 5, as well as their arrangement will be effected by those skilled in the art as indicated hereinunder.

The operation of the device is easy to understand.

By capillary action, the elements 5 absorb water from the tank 1a. Then, the soda lime being in contact with the elements 5, a migration of water to the soda lime located in the vicinity of elements 5 can be observed.

The carbon dioxide-containing gas is introduced into the device through the orifice 2 and flows vertically, as indicated by the arrows (FIG. 2), passing through the filtering cartridge 4.

The carbon dioxide is absorbed when it contacts the soda lime.

At the level of orifice 3 is collected a purified gas, whose carbon dioxide content is lower than a fixed proportion.

As already pointed out, the gas flow tends to dry the soda lime, but the water content of this soda lime is maintained above a predetermined value by the elements 5.

It should be noted that, during its passage through the lower zone of the cartridge 4 which is directly humidified by the elements 5, the gas carries along a certain quantity of water which humidifies the upper portion of cartridge 4.

By this way, the water content of the soda lime is substantially the same at any point of the filtering cartridge 4. The size characteristics of the device will be determined by those skilled in the art in accordance with the specific use contemplated.

Generally, the flow rate Q of the gas to be treated, as well as its carbon dioxide ($CO_2$) content $t_e$ are known in advance. The pressure difference $\Delta P$ between the inlet and the outlet orifices and the maximum permissible carbon dioxide content $t_s$ of the gas recovered at the outlet orifice 3 are fixed by the operator.

Soda lime is used in the form of granules of known size.

There is usually selected soda lime granules having diameters from 3 to 5 mm, which are easily available on the market and whose absorption capacity K of carbon dioxide is indicated by the manufacturer.

One gram of soda lima absorbs at least 250 mg of carbon dioxide.

Knowing the gas flow rate Q and the minimum operating time of the decarbonator, the quantity M of soda lime to be used is:

$$M = \frac{QT(t_e - t_s)}{K}$$

The volume V of the cartridge can be deduced therefrom:

$$V = \frac{M}{d}$$

M being the weight of the soda lime and $d$ its volumetric density (specific gravity).

The pressure difference $\Delta P$ between the inlet orifice 2 and the outlet orifice 3 being fixed, the cross section S and the length L of the cartridge which creates the pressure drop $\Delta P$ are then determined experimentally.

The size and position of the elements are determined as hereunder indicated.

The decrease in the water amount contained in the soda lime, as a result of the gas flow, is determined experimentally.

The amount of water carried by the gas flow rate Q is designated by $Q_{water}$.

It has been ascertained that the greatest efficiency of the device according to the invention is obtained when the water content of the soda lime is from 10 to 30%, and preferably close to 16%.

Under these conditions, it will be readily understood that the elements 5 must permit passage through the cartridge of a water amount at least equal to the amount of water carried by the gas flow, since, as above indicated, the water content of the soda lime of commercial grade is generally of about 16%.

A fibrous material capable of being impregnated by water is selected, and the value $S_c$ of the overall outer surface of the elements 5 contacting the soda lime, which value makes possible the transference of water into the soda lime at a flow rate at least equal to $Q_{water}$ is experimentally determined.

There is also determined experimentally the distance $d$ (FIG. 3) which characterizes the zone wherein the migration of water through soda lime is sufficient to permit an efficient operation of the device according to the invention.

The elements 5, of suitable shape, are positioned with their adjacent outer walls spaced by at most $2d$.

In practice, all the experimental determinations need to be made only once and the obtained values are extrapolated in the case of building a decarbonator of different performances or size.

It is however also possible to draw up calculation charts giving all the required values.

By way of example, a decarbonator has been constructed, whose filtering cartridge has a square cross-section of $140 \times 140$ mm and a 200 mm height.

The elements 5 were constituted of 5 plates of fibrous material 1 mm thick, placed parallely at a distance of $2d = 28$ mm from each other.

The portion of each plate penetrating in the filtering cartridge 4 was 100 mm height and 73 mm wide, thus providing a contact surface of:

$$100 \times 73 \times 2 \times 5 = 73,000 \text{ mm}^2$$

Without any addition of water and with a gas flow rate of 7 m³/h, it was possible to decarbonate 56 m³ of air at 20° C; the $CO_2$ content at the outlet of the device was 100 parts per million (p.p.m).

With addition of water it becomes possible, using the same device, to decarbonate 525 m³ of air and to reach a $CO_2$ content of less than 60 ppm; or to decarbonate 260 m³ of air down to 10 ppm.

The above-indicated values clearly show the advantage and superiority of the device of the invention as compared to prior devices.

As it is apparent from the above description, the embodiment of FIG. 2 permits an optimum efficiency of the decarbonator, by automatic compensation of the water losses due to the passage of gas through the filtering cartridge, so that the water content of the soda lime remains substantially constant in the range from 10 to 30% and, preferably, close to 16%.

Moreover, the vertical gas flow through the device permits a homogeneous decarbonation of the gas.

FIG. 4 illustrates another embodiment of the invention wherein the gas to be decarbonated flows horizontally.

In this case, the elements supplying the filtering cartridge with water consist of porous tubular elements 5a having for example a closed end, and their other end in communication with a water supply pipe 6.

The tubular elements may also be made of non-porous material, their cylindrical surface being then perforated with small holes.

Obviously in this second embodiment, fibrous elements 5 (not illustrated) may be substituted for the tubular elements 5a.

Though it seems preferable to provide a continuous water supply to the soda lime, it is also possible to effect this water supply periodically, for example when the device has been operated over a certain period.

Other modifications can be made without departing from the scope of the present invention.

For example, a fraction of the water may be introduced into the cartridge by the gas to be decarbonated, using any known means to increase the hygrometric degree.

When it is desired to operate the device at a temperature different from room temperature, for example when the ambient temperature is lower than zero degree Celsius, the device may comprise means adapted to maintain it at a determined temperature. These means, diagrammatically shown at 7 in FIG. 5, may consist of heating elements, operated when the temperature must be higher than room temperature, or cooling elements in the opposite case. It will however be possible to change the gas temperature, in order to fix the working temperature of the device.

The uses of the device according to the invention are numerous. In particular, this device may be used for decarbonating the air supplied to fuel cells, but it can also be used for decarbonating air in a confined space, etc...

What we claim is:

1. A device for decarbonating a flow of gas or gas mixture containing carbon dioxide, this device comprising a vessel provided with an inlet orifice for the gas to be decarbonated, and an outlet orifice for recovering the decarbonated gas, a filtering cartridge containing a $CO_2$-absorbent, this filtering cartridge being positioned between said inlet and outlet orifices so as to be traversed by the whole gas flow, the device further comprising means for compensating, at least partially, any decrease in the water content of the $CO_2$-absorbent, said compensating means comprising a water source means and at least one hollow element for continuously transferring water from said water source means to said filtering cartridge, said hollow element penetrating into the filtering cartridge and having a perforated outer surface in contact with the $CO_2$-absorbent, and said hollow element being connected to said water source means, said compensating means maintaining the water content of the $CO_2$-absorbent in the range of 10 to 30%.

2. A device according to claim 1, wherein said compensating means is constructed to maintain the water content of the $CO_2$-absorbent contained in the filtering cartridge at substantially 16%.

3. A device according to claim 1, wherein said water source means is a water containing tank.

4. A device according to claim 1, wherein the wall of said hollow element is permeable to water.

5. A device according to claim 1, further comprising means for regulating the temperature of said filtering cartridge at a value different from that of the surrounding medium.

6. A device according to claim 1, wherein said absorbent is soda-lime.

7. A device according to claim 1, wherein said filtering cartridge consists essentially of said $CO_2$-absorbent.

8. A device according to claim 7, wherein said filtering cartridge consists of said $CO_2$-absorbent.

9. A device according to claim 1, wherein said inlet and outlet orifices are mounted on said vessel to accommodate gas flow horizontally, and wherein a plurality of said hollow elements are provided to penetrate downwardly into said filtering cartridge transverse to the gas flow and be in contact with said absorbent, said water source means being located above said cartridge to transfer water to ends of said elements above said cartridge downwardly into said cartridge.

10. A device for decarbonating a flow of gas or gas mixture containing carbon dioxide, this device comprising a vessel provided with an inlet orifice for the gas to be decarbonated, and an outlet orifice for recovering the decarbonated gas, a filtering cartridge containing a $CO_2$-absorbent, this filtering cartridge being positioned between said inlet and outlet orifices so as to be traversed by the whole gas flow, the device further comprising means compensating, at least partially, for any decrease in the water content of the $CO_2$-absorbent, said compensating means comprising a water source means and at least one element for continuously transferring water from said water source means to said filtering cartridge,
- wherein said water source means is a water containing tank, and
- wherein said element is made of a fibrous material, one end of said element being immersed in the water of said tank and the other end of said element penetrating in the filtering cartridge, said element having a predetermined contact surface with the $CO_2$-absorbent in said cartridge, said element providing for water transfer by capillary action.

11. A device according to claim 10, wherein said inlet and outlet orifices are mounted on said vessel to accommodate gas flow vertically, and wherein a plurality of said elements are provided to penetrate upwardly into said filtering cartridge parallel to the gas flow and be in contact with said absorbent, said water source means being located below said filtering cartridge to transfer water to ends of said elements below said cartridge upwardly into said cartridge.

12. A device according to claim 10, wherein the amount of said contact surface is selected so that the flow rate of the water transferred into the $CO_2$-absorbent automatically and substantially compensates for any decrease in the water content of the $CO_2$-absorbent.

13. A device according to claim 12, comprising a plurality of elements providing for the water transfer into said absorbent wherein the distance between two adjacent elements in such that the water content of said absorbent midway between said adjacent elements is at least 10%.

14. A device according to claim 13, wherein said water tank is located below said filtering cartridge.

15. A device according to claim 13, wherein said water tank is formed by an extension of said vessel, below said filtering cartridge.

16. A device according to claim 14, wherein said inlet orifice for the gas flow to be decarbonated is located below said outlet orifice for recovering the decarbonated gas.

17. In a device for decarbonating a gas mixture containing carbon dioxide including a filtering cartridge formed from soda-lime through which the gas mixture to be decarbonated is passed, the improvement comprising compensating means for maintaining the water content of the soda-lime in said filtering cartridge to 10 to 30%, said compensating means comprising a water-containing tank and at least one element for transferring water from said tank to said filtering cartridge said at least one element being so constructed that water is transferred from said tank to said filtering cartridge by capillary action.

18. The device according to claim 17, wherein said filtering cartridge defines an upstream portion and a downstream portion with respect to the flow direction of gas passing therethrough, said at least one element being received in the upstream portion of said filtering cartridge only.

19. The device according to claim 18, wherein said compensating means is constructed to maintain the water content of said soda-lime at 16%.

* * * * *